United States Patent
Kawahata

(10) Patent No.: US 8,873,804 B2
(45) Date of Patent: Oct. 28, 2014

(54) TRAFFIC MONITORING DEVICE

(75) Inventor: Yasutaka Kawahata, Otsu (JP)

(73) Assignee: Optex Co., Ltd., Shiga (JP)

( * ) Notice: Subject to any disclaimer, the term of this patent is extended or adjusted under 35 U.S.C. 154(b) by 181 days.

(21) Appl. No.: 13/545,251

(22) Filed: Jul. 10, 2012

(65) Prior Publication Data

US 2013/0016880 A1    Jan. 17, 2013

(30) Foreign Application Priority Data

Jul. 11, 2011  (JP) ................................. 2011-152658

(51) Int. Cl.
| | | |
|---|---|---|
| G01S 3/02 | (2006.01) | |
| G06K 9/62 | (2006.01) | |
| G07C 9/02 | (2006.01) | |
| G07C 9/00 | (2006.01) | |
| G06K 9/00 | (2006.01) | |

(52) U.S. Cl.
CPC .............. *G07C 9/025* (2013.01); *G06K 9/6203* (2013.01); *G06K 9/00778* (2013.01); *G06K 9/00362* (2013.01); *G07C 9/00* (2013.01)
USPC ........................................................ 382/103

(58) Field of Classification Search
None
See application file for complete search history.

(56) References Cited

U.S. PATENT DOCUMENTS

| | | | |
|---|---|---|---|
| 7,536,253 | B2 | 5/2009 | Ohba et al. |
| 2005/0201612 | A1 | 9/2005 | Park et al. |
| 2006/0187120 | A1* | 8/2006 | Ohba et al. .................. 342/454 |
| 2008/0130948 | A1* | 6/2008 | Ozer ............................ 382/103 |
| 2011/0282906 | A1* | 11/2011 | Wong ........................... 707/780 |

FOREIGN PATENT DOCUMENTS

| | | |
|---|---|---|
| EP | 1686544 A2 | 8/2006 |
| EP | 1772752 A1 | 4/2007 |
| GB | 2294114 A | 4/1996 |
| JP | 05229756 | 9/1993 |
| JP | 2004094825 A | 3/2004 |
| JP | 2004187125 A | 7/2004 |
| JP | 2006-209572 A | 8/2006 |
| JP | 2010045501 A | 2/2010 |
| JP | 2010238169 A | 10/2010 |
| JP | 2010-262527 A | 11/2010 |
| WO | 2005081193 A1 | 9/2005 |

OTHER PUBLICATIONS

Decision of Gran for Japanese Application No. 2011-152658; Dec. 18, 2012.
Decision of Grant for Japanese Application No. 2011-152658; Dec. 18, 2012.
European Search Report; Application No. 12174009.6-1953/2546807; Apr. 5, 2013.

* cited by examiner

*Primary Examiner* — Amara Abdi
(74) *Attorney, Agent, or Firm* — Sughrue Mion, PLLC

(57) ABSTRACT

A traffic monitoring device determines accurately the number of objects (H) such as, for example, human bodies present within a supervised sector (8), without being affected by influences of a clinging condition of a plurality of heads and/or hairdos. In determining the number of the objects (H), this traffic monitoring device performs a template matching with template blocks (20) of the shape of the objects (H), in which block areas including heads (α), hairdos buffer units (β) and shoulders (γ) are represented by template images, relative to the block projected image acquired from a three dimensional object information resulting from a detection block (B1) related to the objects (H) present within the supervised sector (8).

6 Claims, 10 Drawing Sheets

HEAD REFERENCE α
SHOULDER REFERENCE γ

TRAFFIC MONITORING DEVICE

CROSS REFERENCE TO THE RELATED APPLICATION

This application is based on and claims Convention priority to Japanese patent application No. 2011-152658, filed Jul. 11, 2011, the entire disclosure of which is herein incorporated by reference as a part of this application.

BACKGROUND OF THE INVENTION

1. Field of the Invention

The present invention relates to a traffic monitoring device for monitoring the number of objects such as, for example, passers-by then moving through a supervised sector defined at, for example, a doorway provided with a revolving door.

2. Description of Related Art

As a security technology for curbing the flow of information from a corporate building, it has become a recent wide spreading trend to install the authenticating device at an important doorway of the corporate building so that the door at the doorway can be opened only when the authenticating device identifies the bearer of an ID card or fingerprint by the ID card or fingerprint of the bearer.

According to the conventional security technology of the kind referred to above, precaution is needed to avoid the unauthorized entry of someone other than the bearer of the ID card or fingerprint, who attempts to sneak through the doorway together with the bearer who has been authorized by the authenticating device at the doorway to pass through the doorway. In view of this, the patent document 1 listed below, for example, suggests a traffic monitoring device for monitoring the number of passers-by then gathering in crowds by analyzing the area of an image to be analyzed, which area is a showing of passers-by appearing in a plurality of sliced images, in reference to the benchmark representing the position of the peak point in the three dimensional image data for each of selected closed regions.

On the other hand, the patent document 2 listed below, for example, suggests, as a different monitoring means, a method of determining the number of objects based on the volume of those objects in reference to three dimensional object information representing the objects appearing in the supervised sector.

PRIOR ART LITERATURE

[Patent Document 1] JP Laid-open Patent Publication No. 2010-262527
[Patent Document 2] JP Laid-open Patent Publication No. 2006-209572

DISCLOSURE OF THE INVENTION

It has been found that since the conventional technologies are such that the number of the objects is determined on the basis of the area or the volume, they are incapable of determining the number of objects accurately and with no error by the following reason. Specifically, considering that the hairstyle of people differs greatly from person to person, and particularly where some people have a voluminous hairdo, it has often occurred that the head of such people cannot be accurately grasped under the influence of the particular hairstyle and that the determination of the number of objects often results in error because the shape of the object is not taken into consideration. Also, in the case where a plurality of passers-by walk in crowds with their heads clung to each other, it is difficult to break up a crowd of those passers-by and it similarly often occurs that the number of them tends to be erroneously determined.

In view of the foregoing, the present invention has been devised to substantially eliminate the problems and inconveniences discussed hereinabove and is intended to provide a traffic monitoring device capable of accurately determining the number of objects such as human bodies appearing in a supervised sector with the respective shapes of those objects taken into consideration and without being affected by the hairstyle and the flocking heads.

In order to accomplish the foregoing object, the present invention herein disclosed provides a traffic monitoring device which includes an object information acquiring section including a detection block calculating unit for acquiring, with the use of distance images acquired by imaging an object from above within a supervised sector that is divided into a plurality of blocks, a block having distance measured pixels, obtained by imaging the object from above, as a detection block related to an object present within the supervised sector and operable to acquire a three dimensional object information by the detection block; a block projected image generating unit for generating a two dimensional image, which is a height data of the detection block, by projecting onto a horizontal plane the detection blocks, each having a height data on a two dimensional plane: a template setting unit for setting a template block of a shape related to an object with a block area containing a head, a hairdos buffer unit and a shoulder rendered to be a template image; a template matching unit for performing a template matching with the block projected image by means of the template block; and a determining unit for determining the number of objects based on the template matching.

According to the traffic monitoring device designed in accordance with the present invention, the number of the objects is determined by performing the template matching of the block projected image, acquired from the three dimensional object information by the detection blocks related to the object present within the supervised sector, by means of the template blocks of the shape of the object while the block region including the head, the hairdos buffer unit and the shoulder is rendered to be a template image, to thereby consider the shape of the object to accurately grasp the head without being affected by the influence brought about by the hairdos and, accordingly the number of the objects such as, for example, human bodies can be accurately determined. Also, even when the two or more human body pass by with their heads generally clung together, the number thereof can be accurately determined.

The template setting unit may set the block of the shape of the human body having the head of a predetermined height at a center portion thereof with respect to at least the shoulder. In this case, the number of the objects can be further accurately determined by making a search for a head following a shoulder in the block projected image on the basis of the template block.

The template setting unit referred to above may have a plurality of types of template blocks each having the different shape of the human body. In this case, the number of the objects can be further accurately determined according to the type of a passer-by, if the plurality of types different in, for example, the size of the head and/or the hairdos.

The template matching unit may perform, when one human body is detected during the template matching, an extraction of heads of a plurality of human bodies, which approach as clinging together in a direction forwards or rearwards, leftwards or rightwards, by performing a template matching again after the head of the human body detected has been erased. In this case, regardless of the condition of approach of the heads of the plural human bodies, the number of the objects can be determined further accurately.

When determination of whether or not they are blocks in which the object exists, is made on the basis of the number of distance measuring points within the blocks, in which imaging distance has been able to be obtained by the presence of the object, the detection block calculating unit may varies a threshold value of the number of the distance measuring points according to the predetermined distance to each block, or may add a weighting according to the imaging distance of each pixel to objects, with the threshold value of the number of the distance measuring points fixed. In this case, it can accommodate reduction in number of the distance measuring points of the block as the imaging distance of a camera increases and, therefore, the accuracy of the numerical quantity determination can be increased.

It is to be noted that any combination of two structural features claimed in the appended claims and/or disclosed and shown in the specification and/or the accompanying drawings should be construed as included within the spirit of the present invention. In particular, any combination of two or more of the appended claims should be construed as included within the spirit of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
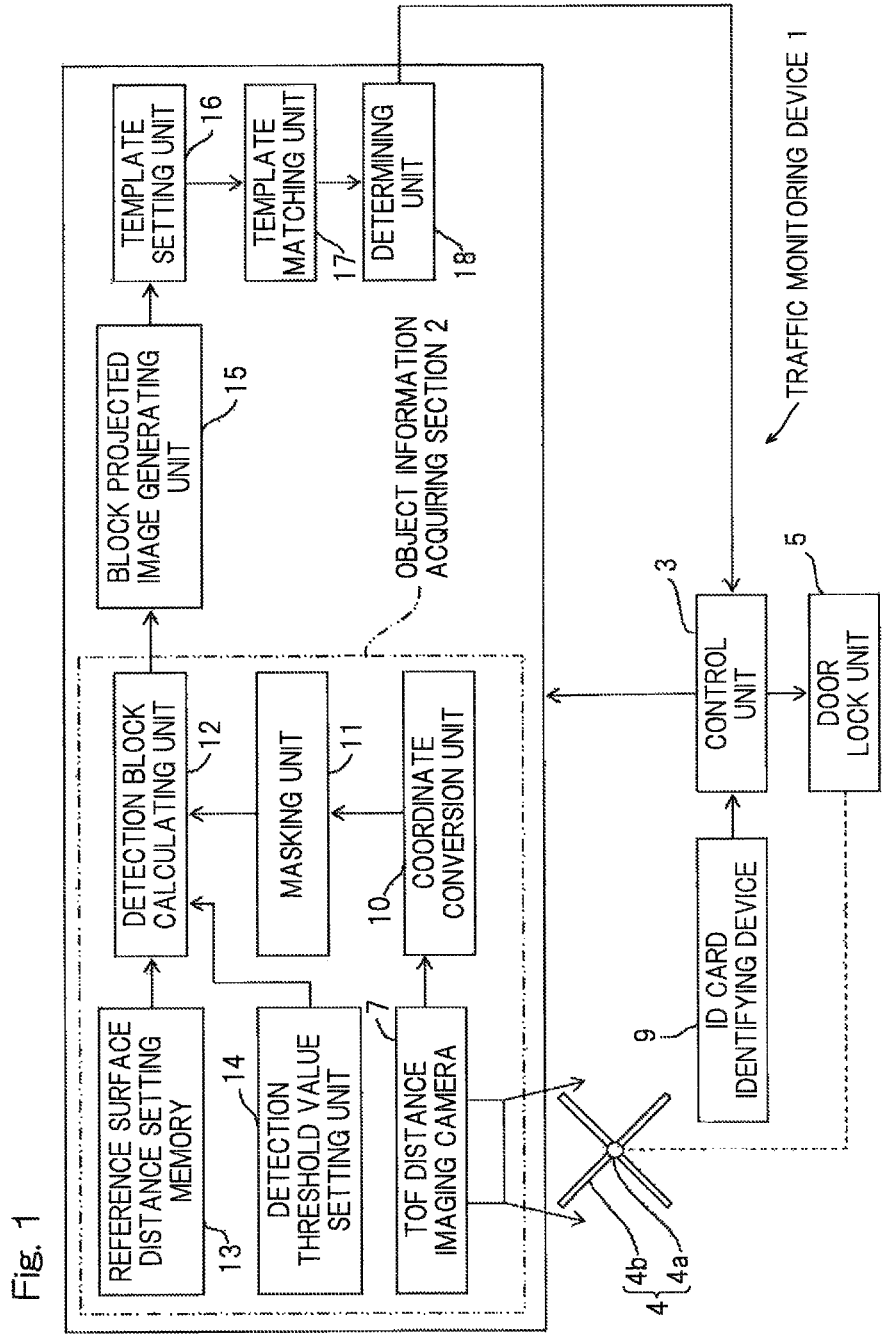
FIG. 1 is a block diagram showing a traffic monitoring device designed in accordance with a preferred embodiment of the present invention.
Figure 2:
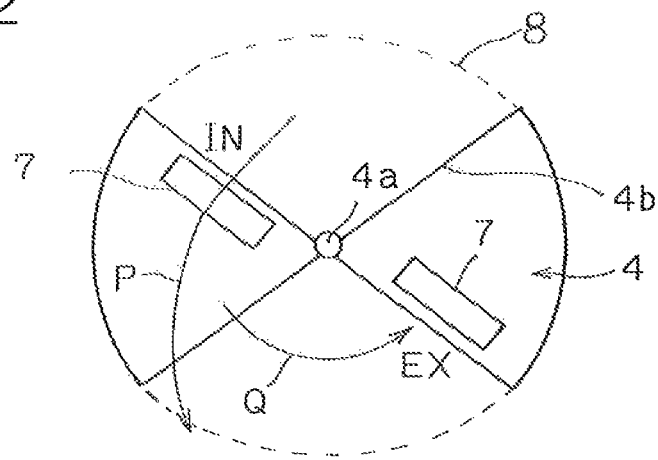
FIG. 2 is a schematic top plan view showing a supervised sector that is monitored by the traffic monitoring device of the present invention.

FIG. 1 illustrates a block diagram of a traffic monitoring device designed in accordance with one preferred embodiment of the present invention. A traffic monitoring device 1 for determining the number of objects from a three dimensional object information acquired in connection with objects present within a supervised sector to be monitored by the device includes a control unit 3 for controlling the operation of a revolving door 4 on the basis of the result of determination of the number of the objects and a door lock unit 5 adapted to be controlled by the control unit 3 to lock the revolving door 4. Accordingly, in describing the illustrated embodiment, reference is made by way of example to the traffic monitoring device used in monitoring the number of objects such as, for example, human bodies moving in a particular direction, shown by the arrow P, while the revolving door 4 shown in FIG. 2 is revolved in a direction shown by the arrow Q.

The revolving door 4 is of a type comprised of a center shaft 4a, having its opposite top and bottom ends rotatably supported respectively by, and extending between, the ceiling and the floor of a building, and a plurality of, for example, four, door panels 4b, each with glass in the pane, which are supported by the center shaft 4a so as to project radially outwardly from the latter while angularly spaced an equidistance from each other about the center shaft 4a. Referring to FIG. 2, the way-in area IN of the revolving door 4 is shown in a left portion of FIG. 2 and the way-out area EX of the revolving door 4 is shown in the right portion of FIG. 2 laterally opposite to that left portion. Distance imaging cameras 7 of a known TOF (Time of Flight) device for imaging an object from above are fitted thereto a portion of the ceiling above a gateway zone, in which the revolving door 4 revolves, so as to closely confront the way-in area IN and the way-out areas EX, respectively, and a supervised sector 8 to be monitored, shown by the phantom line in FIG. 2, are defined by those distance imaging cameras 7. By detecting the angle of revolution of the revolving door 4 with an encoder, a monitoring area of the supervised sector to be imaged by the distance imaging camera 7 is changed in unison with the angle of revolution. In the following description, reference will be made only to the device necessary to monitor the traffic through the way-in area IN for the sake of brevity.

The entrance to the revolving door 4 is provided with an ID card identifying device 9, shown in FIG. 1, which device 9 is operable to identify whether or not an ID card inserted in the ID card identifying device 9 is authentic and then to output an identification signal representative of the result of identification to the control unit 3. When the identification signal, showing that the ID card identifying device 9 has identified that the ID card so inserted is authentic, is inputted to the control unit 3, the control unit 3 performs a control to initiate a sequence of the operation of acquiring object information through determining.

An object information acquiring section 2 shown in FIG. 1 includes the distance imaging camera 7 of the TOF (Time of Flight) device, a coordinate conversion unit 10, a masking unit 11, a detection block calculating unit 12 and a reference surface distance setting memory 13 and is activated in response to a command from the control unit 3 to acquire a three dimensional object information in the following manner. Specifically, the distance imaging camera 7 of the TOF device is of a type capable of calculating the distance to an object in reference to the time of flight of light, required for light, which has been emitted from a light source and subsequently reflected from the object, to reach a light receiver (sensor) and the speed of light and is capable of acquire distance from the origin, i.e., the position of the distance imaging camera 7, to the object to be imaged for each pixel. In place of the distance imaging camera 7 of the TOF device, however, a stereovision sensor capable of acquiring a three dimensional object information with the use of two cameras can be employed.

The supervised sector 8 applicable dependent on the angle of revolution of the door panes 4b of the revolving door 4 is divided into a plurality of three dimensional blocks above a two dimensional plane (for example, the floor surface in the illustrated example), each block having a predetermined height, and the coordinates of those blocks are stored in a monitoring area setting memory (not shown). The distance from the distance imaging camera 7 to the reference surface (which is the floor surface in the instance as shown and is therefore referred as the floor surface hereinafter) is stored beforehand in the reference surface distance setting memory 13 referred to previously as a reference distance.

Figure 3:
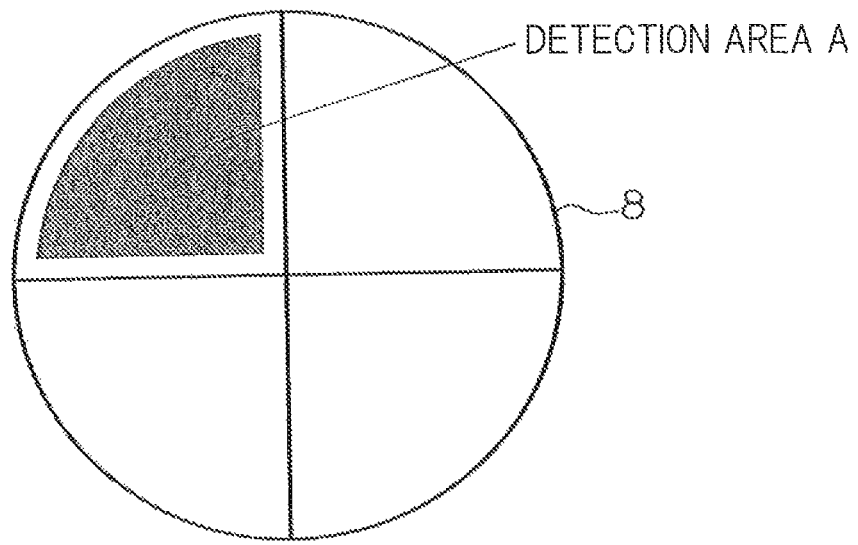
FIG. 3 is a schematic plan view showing a detection area against the supervised sector.

The coordinate conversion unit 10 shown in FIG. 1 converts pixel values from a camera coordinates, with the distance imaging camera 7 taken as the point of origin, into a door coordinate device with the point of intersection between a line perpendicular to the floor surface and the floor surface taken as the point of origin. It is to be noted that the rotary shaft 4a of the revolving door 4 may be taken as the point of origin of the door coordinate device. The masking unit 11 referred to previously may mask a region, in which a rated value is offset from a door surface in order to relieve an erroneous operation of the distance imaging camera 7 of the TOF device, which may result from reflection of light from the distance imaging camera upon glass panes of the revolving door 4. In other words, as shown in FIG. 3, a region of the supervised sector 8 except for a detection area A is masked so that a distance information within the detection area A can be used for determination.

Figure 4A:
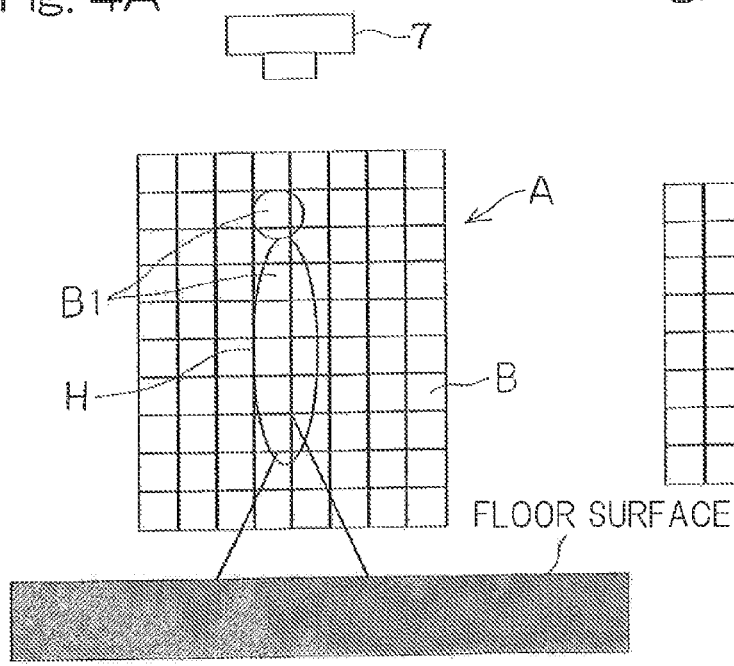
FIG. 4A is a schematic diagram showing blocks of the supervised sector as viewed from a lateral side.
Figure 4B:
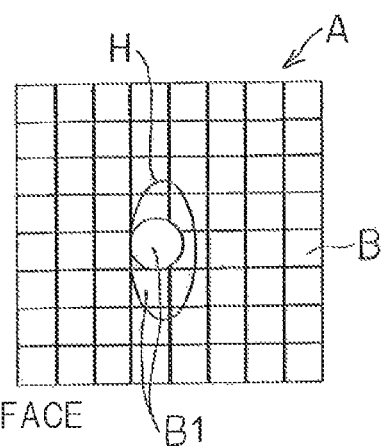
FIG. 4B is a schematic diagram showing the blocks of the supervised sector as viewed from top.

FIG. 4A illustrates the blocks B within the detection area A as viewed from a lateral side and FIG. 4B illustrates the blocks B as viewed from top. As shown in FIG. 4A, a human body H is imaged from above by the distance imaging camera 7 and, as shown in FIG. 4B, the head of the human body H (including a hairdos thereof) and tops of shoulders thereof are imaged, and using those distance images, only a distance information within the detection area A is extracted from the blocks B stored in the monitoring area setting memory. The detection block calculating unit 12 referred to previously determines that the blocks B are a detection block B1, in which the human body H exists, in the event that the number of distance measuring points within the blocks B, for which the imaging distance of an object to be imaged has been able to be obtained, exceeds a threshold value that is set for each of the blocks B stored in a detection threshold value setting unit 14. The threshold value stored in the detection threshold value setting unit 14 is alienated as the density of the measuring points becomes distant from the distance imaging camera 7 and, accordingly, a remote side has a low threshold value.

Assuming that the threshold value of the number of distance measuring point within the blocks B for determining the detection blocks B1 is expressed by t and, also, assuming that, for example, the distance between the blocks B and the distance imaging camera 7 is expressed by r and the arbitrarily chosen constant is a, the threshold value t can be fixed by the following equation:

$$t = a/(r^2) \text{ (``\textasciicircum'' represents power (series))}$$

It is to be noted that in place of the threshold value of the number of distance measuring points being varied depending on the imaging distance as expressed by the above equation, the threshold value of the number of distance measuring points may be fixed and the weighting may be added to the number of distance measuring points according to the imaging distance.

At this time, the detection block calculating unit 12 referred to above makes use of a function of the distance r to the object to be imaged as a weighting to the pixels in which the object to be imaged has been imaged so that in the event that the sum of weightings to the pixels falling within the blocks is greater than the threshold value t, the detection blocks B1 can be deemed as involving the human body present therein. By way of example, for this weighting, such a function proportional to the square of the distance r from the distance imaging camera 7 is employed.

By converting the above distance image into the detection blocks, the following effects (1) to (3) can be obtained. Namely, (1) any small change in shape such as, for example, any slight change in hairdos, accessory applied to the head and/or wrinkles of the clothing can be rounded up, (2) the amount of information becomes small and, hence, a template can be adopted at high speed since projection is made from the three dimensional shape into the two dimensional image, and (3) influences brought about by noises during the imaging by the distance imaging camera 7 can be eliminated.

Figure 5:
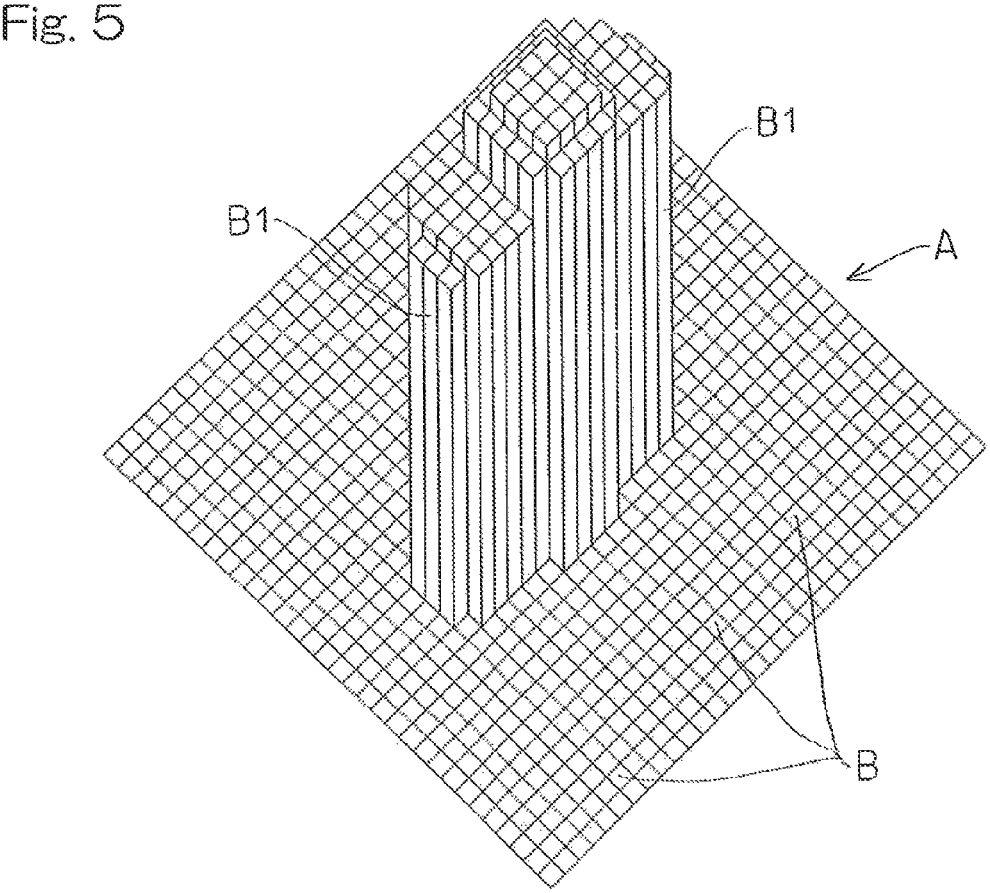
FIG. 5 is a diagram schematically illustrating a three dimensional object information acquired by the traffic monitoring device of the present invention.

FIG. 5 schematically illustrates the three dimensional object information acquired by the detection block calculating unit 12, showing the height of the object within the detection area A for each of the detection blocks B1. In this way, the three dimensional object information depicted in each of the detection block B1 is acquired by the objection information acquiring section 2 referred to previously.

A block projected image generating unit 15 shown in FIG. 1 is an unit for generating a two dimensional image, which is data on heights in the detection blocks, by projecting the detection blocks B1, each having a height data on the two dimensional plane, onto a horizontal plane of the distance set in the reference surface distance setting memory 13 and is operable to generate a block projected image, which is a two dimensional image having the height data as a pixel value, by employing the height data on the block at the highest position out of the detection blocks B1.

Figure 6A:
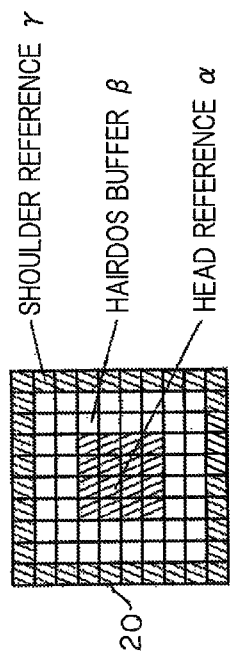
FIGS. 6A to 6C are diagrams showing template blocks of a stereoscopic shape of a human body.
Figure 6B:
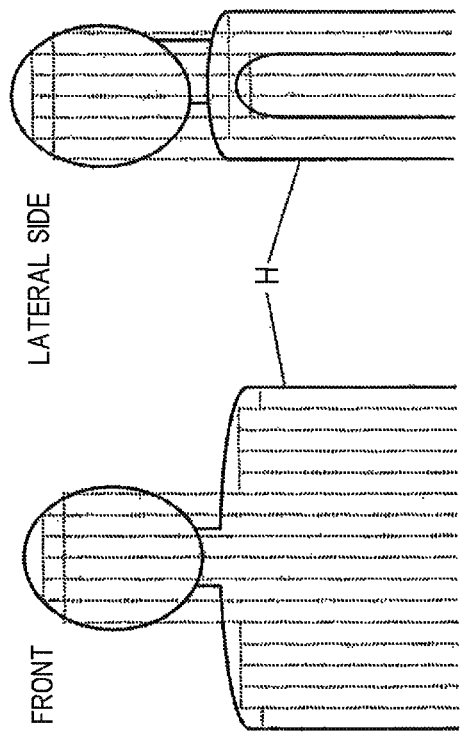
Figure 6C:
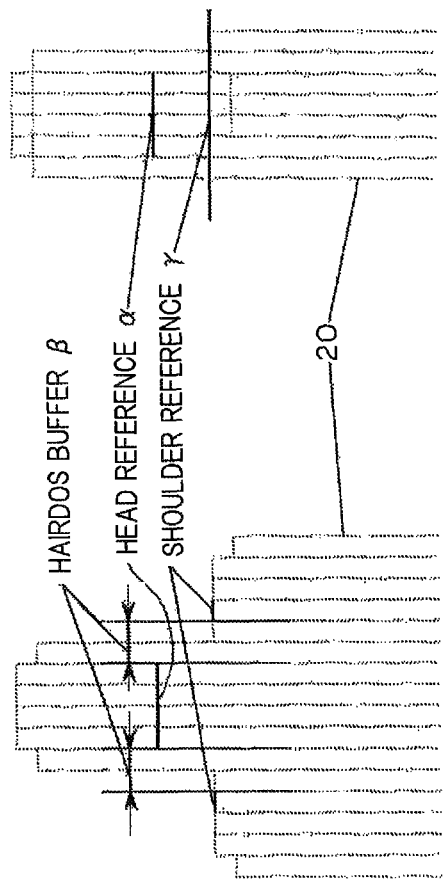

A template setting unit 16 applies template blocks of the shape of a human body, in which block areas including the head, a hairdos buffer unit and a shoulder are used as a template image. FIGS. 6A to 6C illustrate one example of the template block 20 of the shape of the human body, in which FIG. 6A is a top plan view of the template block 20, FIG. 6B is a schematic view of the human body H and its block projected image as viewed from front and lateral side, and FIG. 6C is a view showing the template block 20, as viewed from front and lateral side, when the template block 20 is applied to the shape of the human body H. As shown therein, the template block 20 represents at large a three dimensional shape including the shoulder reference γ and the head reference α of a predetermined height at a center portion through a hairdos buffer unit β. In this case, it is preferred to prepare a plurality of types of template blocks for different shapes of human bodies having, for example, different heads and/or sizes of the hairdos and, by so doing, the number of objects can be accurately determined in dependence on the type of a passer-by.

Figure 7A:
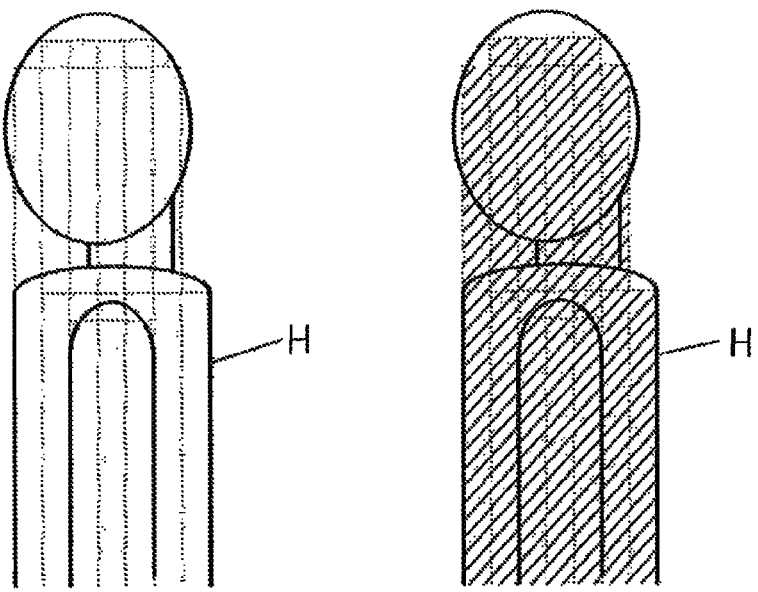
FIGS. 7A and 7B are diagrams showing the operation of the traffic monitoring device of the present invention.
Figure 7B:
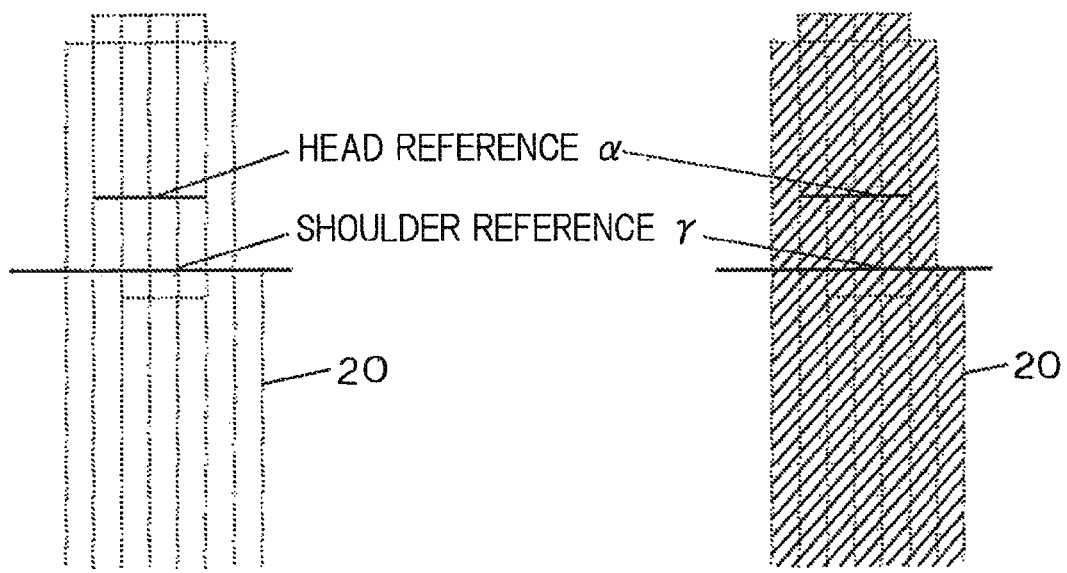

A template matching unit 17 shown in FIG. 1 is operable to perform a template matching with the block projected image by means of the template bock 20. In the event that as shown in FIG. 7A, two human bodies H separated from each other intrude, template blocks 20 are applied to those human bodies H, respectively, and accordingly it can be ascertained that the number of intruders is two. In such case, the height from the maximum point of a shoulder to a head is determined on the block projected image, that is, the matching is performed by first looking for the position which will become a candidate for a shoulder and then looking for a head thereabove. During the matching, when the stipulated number of pixels exceeds the head reference α within the template block 20, it is deemed as the head. In this instance, the candidate for the shoulder is the position greater than the reference height within the block projected image.

Figure 8A:
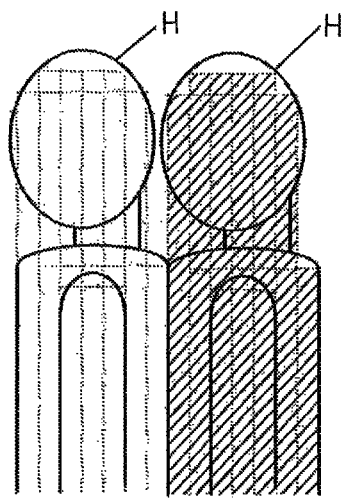
FIGS. 8A and 8B are diagrams showing the operation of the traffic monitoring device of the present invention.
Figure 8B:
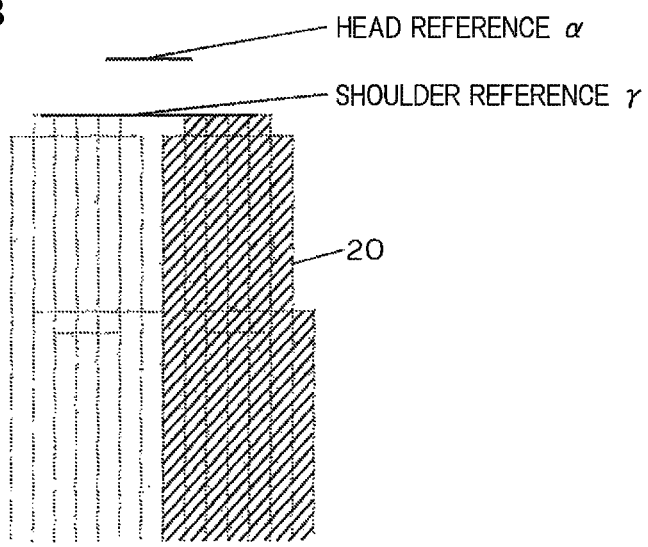

Also, the template matching unit 17 does not perform the matching because, when as shown in FIG. 8A, the two heads approach in the close vicinity of each other as if they were to cling together while having the respective heights of the heads that are equal to each other, those two heads are regarded as the shoulder appearing within the block projected image as shown in FIG. 8B and, hence, it is determined that no head exists at the center when the template block 20 is applied.

Figure 9A:
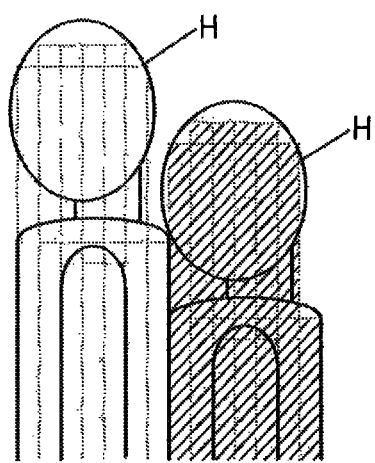
FIGS. 9A to 9C are diagrams showing the operation of the traffic monitoring device of the present invention.
Figure 9B:
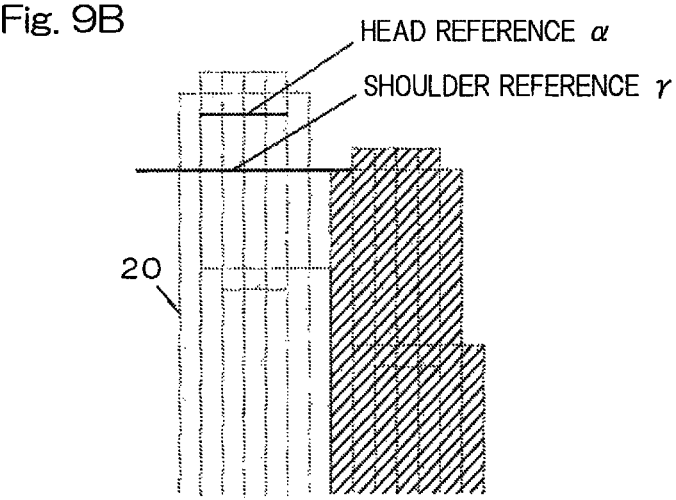
Figure 9C:
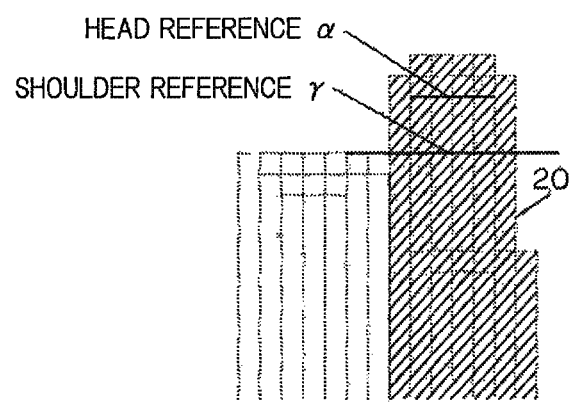

In addition, in the event that as shown in FIG. 9A, the respective heights of the heads of the human bodies H are different from each other and the two heads approach in the close vicinity of each other, as shown in FIG. 9B, as a result of the template matching performed in the template block 20, after one of the heads has been detected, the detected head is removed by concaving (depressing) a predetermined quantity and, as shown in FIG. 9C, the template matching is again performed on the remaining head. As a result thereof, it is possible to detect not only the human body H having a tall height, but also the human body H having a small height and it can be ascertained that the two or more human body are intruding.

It is to be noted that if only one human body H is intruding, the operation to concave or depress the head the predetermined quantity as described above is applied after such one head has been detected, no place that can be determined as the head even, though the waist, for example, is large, as a result of the template block application and, therefore, there is no possibility that one human body H may be erroneously discriminated as two human bodies H.

A determining unit 18 shown in FIG. 1 is operable to determine the number of objects based on the template matching discussed above. In the event that no match establishes as shown in FIGS. 8A and 8B, it determines that the number of the human bodies H is two or more, or other than one human body H. The result of this determination is outputted to the control unit 3, shown in FIG. 1, wherefore the control unit 3 activates the door lock unit 5, when the number of the human bodies H is determined not one, to thereby inhibit the revolution of the revolving door 4.

Even with the monitoring the supervised sector 8 on the side of the way-out area EX shown in FIG. 1, effects similar to those described above can be obtained. It is to be noted that there is the possibility that the supervised sector 8 is provided only on the way-in area IN.

Figure 10:
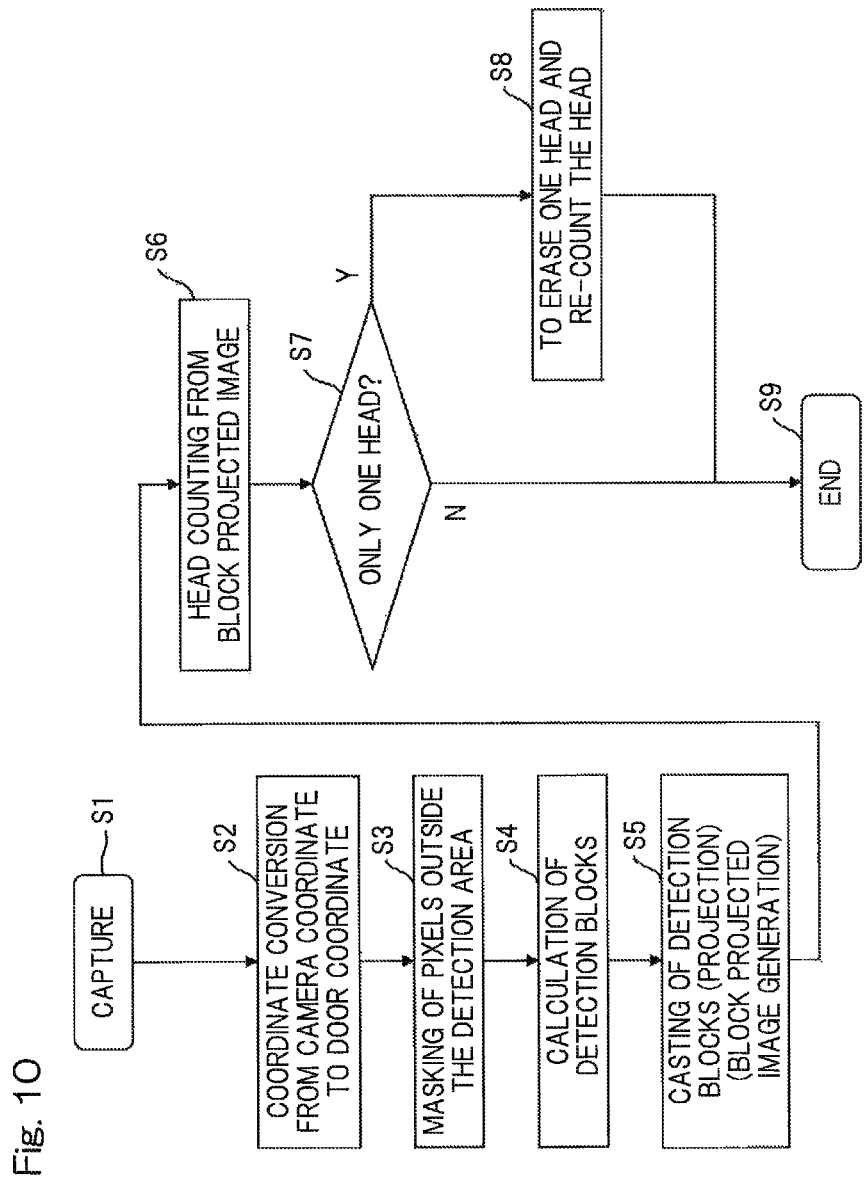
FIG. 10 is a flowchart showing the sequence of operation of the traffic monitoring device of the present invention.

FIG. 10 illustrates a flowchart showing the sequence of operation of the traffic monitoring device of the structure hereinabove described. At the outset, the supervised sector 8 is imagewise captured by the distance imaging camera 7 of the TOF device at step S1. Then at step S2, from the camera coordinate with the distance imaging camera 7 representing the point of origin, the pixel values are converted into the door coordinate with the point of origin represented by the point of intersection between the line, extending perpendicular to the floor surface, and the floor surface. Thereafter, the pixels within an area of the supervised sector 8 excluding the detection area A are masked and the distance information is acquired only from the detection area A at step S3.

At step S4, the detection blocks B1 are calculated to acquire the three dimensional object information containing the height data for each of the blocks related to the human body H existing within the detection area A. Following step S4, step S5 takes place to generate the block projected image, which is a two dimensional image of the height data of the detection blocks B1.

The heads are counted at step S6 from the block projected image with the use of the three dimensional template blocks 20. Then, determination is made at step S7 to ascertain whether or not the head is one. If no head is found despite the presence of the detection blocks, it may be a thing other than one human body H as shown in FIGS. 8A and 8B and, therefore, the door lock unit 5 is locked, with the flow thus terminating at step S9. If the head is only one as shown in FIGS. 9A to 9C, the first head is erased and the number of the heads is again counted at step S8. If there is a further head, it means that it is a thing other than one human body H and, therefore, the door lock unit 5 is locked, with the flow thus terminating at step S9.

With the traffic monitoring device designed in accordance with the present invention, the number of the objects is determined by performing the template matching of the block projected image, acquired from the three dimensional object information by the detection blocks related to the object present within the supervised sector, by means of the template blocks of the shape of the object while the block region including the head, the hairdos buffer unit and the shoulder is rendered to be a template image, to thereby consider the shape of the object to accurately grasp the head without being affected by the influence brought about by the hairdos and, accordingly the number of the objects such as, for example, human bodies can be accurately determined. Also, even when the two or more human body pass by with their heads generally clung together, the number thereof can be accurately determined.

It is to be noted that although in describing the foregoing preferred embodiment of the present invention, reference has been made to the application of the traffic monitoring device to the revolving door, it can be equally applied to a single swinging door such as, for example, any other slide door. In addition, the present invention is not necessarily limited to the monitoring of the human body as an object to be monitored, but can be equally applied to the determination of the number of goods placed on, for example, a belt conveyor and passing through the supervised sector or any other goods, the shape of which need be considered.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Traffic monitoring device
2 . . . Object information acquiring section
7 . . . Distance imaging camera
8 . . . Supervised sector
12 . . . Detection lock calculating section
15 . . . Block projected image generating section
16 . . . Template setting unit 17 ... Template matching unit
20 ... Template block
A ... Detection area
B1 ... Detection block
H ... Human body (Object)
α ... Head Reference
β ... Hairdos buffer unit
γ ... Shoulder Reference

What is claimed is:

1. A traffic monitoring device, which comprises:
an object information acquiring section including a detection block calculating unit for acquiring, with the use of distance images acquired by imaging an object from above within a supervised sector that is divided into a plurality of blocks, a block having distance measured pixels, obtained by imaging the object from above, as a detection block related to an object present within the supervised sector and operable to acquire a three dimensional object information by the detection block;
a block projected image generating unit for generating a block projected image, which is a two dimensional image of a height data of the detection block, by projecting onto a horizontal plane the detection blocks, each having a height data on a two dimensional plane:
a template setting unit for setting a template block of a shape related to the object within a block area, the template containing a head, a hairdos buffer and a shoulder rendered to be a template image;
a template matching unit for performing a template matching with a block projected image by means of the template block; and
a determining unit for determining the number of objects based on the template matching,
wherein the template block has the head adjacent to the hairdos buffer and the hairdos buffer adjacent to the shoulder.

2. The traffic monitoring device as claimed in claim 1, in which the template setting unit sets the block of the shape of an human body having at least the head of a predetermined height at a center portion thereof with respect to the shoulder.

3. The traffic monitoring device as claimed in claim 2, in which the template setting unit has a plurality of types of template blocks each having the different shape of the human body.

4. The traffic monitoring device as claimed in claim 2, in which, when heads of a plurality of human bodies approach as clinging together in a direction forwards or rearwards, leftwards or rightwards such that one human body is detected during the template matching, a detected human body, the template matching unit performs the template matching again with a head of the detected human body erased.

5. The traffic monitoring device as claimed in claim 1, in which the detection block calculating unit varies a threshold value of the number of distance measuring points according to an imaging distance of each block, when determination of whether or not they are blocks in which the object exists, is made on the basis of the number of distance measuring points within the blocks, in which imaging distance has been able to be obtained by the presence of the object.

6. The traffic monitoring device as claimed in claim 1, in which the detection block calculating unit adds a weighting according to an imaging distance of each pixel to objects, when determination of whether or not they are blocks in which the object exists, is made on the basis of the number of distance measuring points within the blocks, in which imaging distance has been able to be obtained by the presence of the object, with a threshold value of the number of the distance measuring point fixed.

* * * * *